United States Patent [19]

Arnegger

[11] Patent Number: 4,564,781
[45] Date of Patent: Jan. 14, 1986

[54] ELECTRICAL BELL TYPE MOTOR

[76] Inventor: Richard E. Arnegger, Rietlirain, 8713 Uerikon, Switzerland

[21] Appl. No.: 624,839

[22] Filed: Jun. 26, 1984

Related U.S. Application Data

[63] Continuation-in-part of Ser. No. 402,837, Jul. 29, 1982, abandoned.

[30] Foreign Application Priority Data

Aug. 7, 1981 [CH] Switzerland .......................... 5088/81

[51] Int. Cl.$^4$ .............................................. H02K 1/22
[52] U.S. Cl. ....................................... 310/261; 310/45; 310/64; 310/67 R; 310/91; 310/208; 310/266; 433/131
[58] Field of Search ........ 310/266, 49, 67 R, 40 MM, 310/154, 50, 90, 208, 45, 261, 51, 265, 91, 42, 54, 64; 29/596; 433/115, 131; 336/213, 233, 234

[56] References Cited

U.S. PATENT DOCUMENTS

| | | | |
|---|---|---|---|
| 3,475,632 | 10/1969 | Moresi | 310/67 R |
| 3,514,654 | 5/1970 | Moresi | 310/266 |
| 3,777,191 | 12/1973 | Pabst | 310/67 R |
| 3,904,902 | 9/1975 | Inariba | 310/266 |
| 4,019,075 | 4/1977 | Kagami | 310/266 |
| 4,103,196 | 7/1978 | Saito | 310/154 |
| 4,130,770 | 12/1970 | Wrobel | 310/67 R |
| 4,412,146 | 10/1983 | Futterer | 310/266 |

FOREIGN PATENT DOCUMENTS

| | | | |
|---|---|---|---|
| 2608889 | 10/1977 | Fed. Rep. of Germany | 310/266 |
| 1090937 | 11/1967 | United Kingdom | 310/266 |

Primary Examiner—R. Skudy
Attorney, Agent, or Firm—Donald D. Denton

[57] ABSTRACT

The present invention relates to an electrical bell type motor for driving a surgical tool, with a stator comprising a magnet having the shape of a circular cylinder and a rotor comprising a wire coil of lacquered wire forming a hollow circular cylinder, and a rotor carrier plate made of antimagnetic stainless steel fixed to a rotatable shaft carrying the wire coil. The wire coil at its one front end is fixed to the rotor carrier plate and the other end is self-supporting.

3 Claims, 1 Drawing Figure

U.S. Patent    Jan. 14, 1986    4,564,781
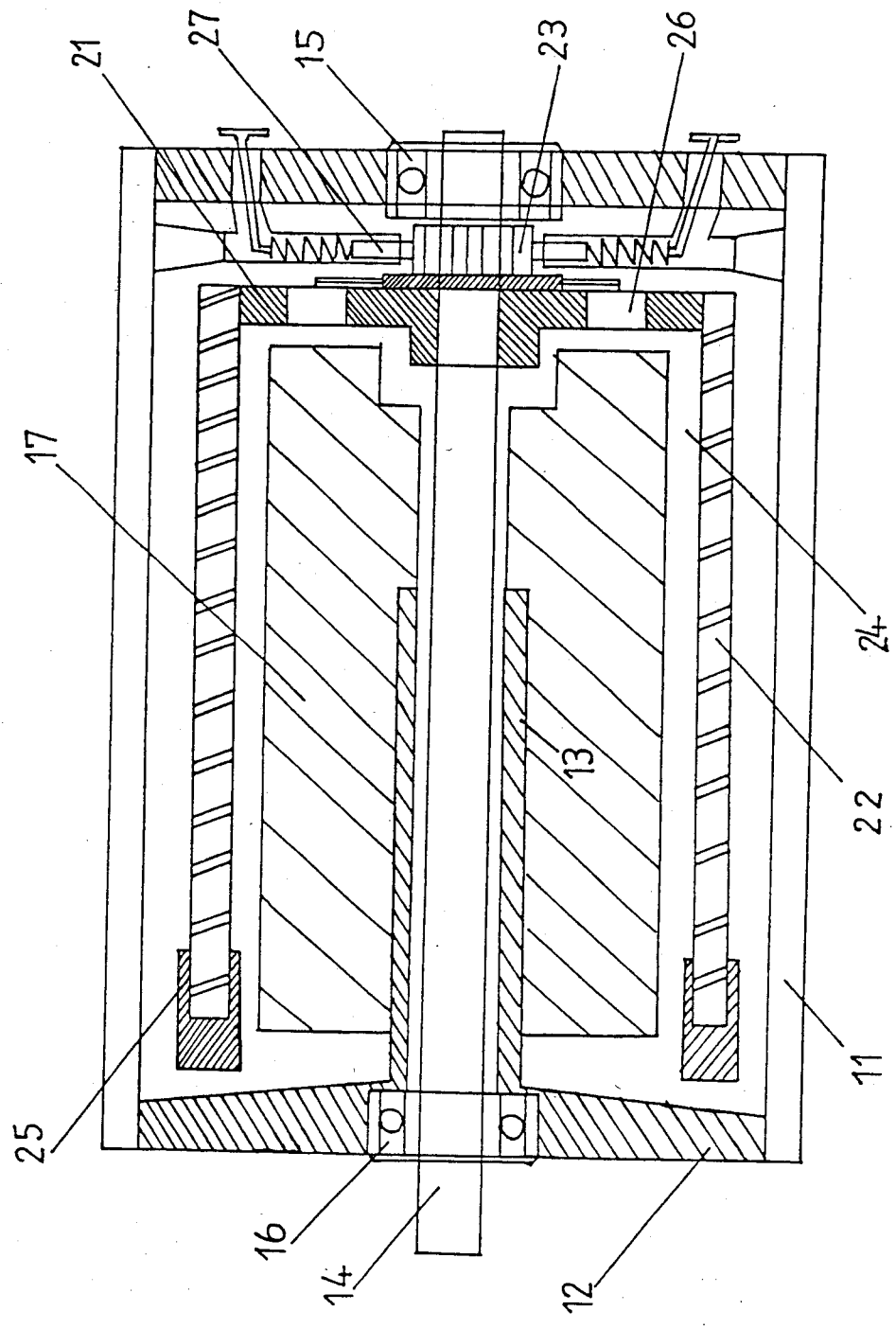

ELECTRICAL BELL TYPE MOTOR

This application is a continuation-in-part patent application of my co-pending application for Letters Patent Ser. No. 402,837 filed July 29, 1982 now abandoned.

BACKGROUND OF THE INVENTION

The present invention relates to an electrical bell type motor for driving a surgical hand tool, with a stator comprising a magnet having the shape of a circular cylinder and a rotor, which comprises a wire coil of lacquered wire forming a hollow circular cylinder, and a rotor carrier plate carrying the wire coil and fixed to a rotatable shaft, in which the wire coil with one of its front ends is firmly mounted onto the rotor carrier plate and the other end is self-supporting.

In the surgical field, especially in the field of bone operations, a large number of different tools are known and in use, which are hand operated by the surgeon and driving by an electrical motor. These tools have to fulfill strong requirements, as for example, be handy, warm up only moderately, capable of being sterilized by autoclavation, and so on. The inventive motor, particularly in relation to these features, shows a marked progress.

SUMMARY OF THE INVENTION

The present invention is characterized in that the rotor carrier plate consists of antimagnetic stainless steel. The rotor carrier plate thus allows an autoclavation of the bell type motor up to a temperature of 140° C. in steam at a pressure of 3 bar. This is possible because under these difficult conditions, the rotor carrier plate will not deform itself. It expands equally in all directions and, after cooling, retakes its former shape and measurements after contraction. The rotor carrier plate is relatively thin, and especially it is thinner than the plate would be if it were made out of plastic material, so that its weight in comparison to a plastic plate is approximately equal. For this reason, the weight of the motor, as well as the heating up of the motor caused by accelerations and retardations during operation, is small. On the other hand, according to the invention, there results an increase of the efficiency of the motor because the air gap between the stator and the rotor can be kept very small. Finally, there is obtained a quiet operation, which is free of vibrations and there is attained the possibility to disinfect by the procedure of autoclavation commonly used in hospitals. In operation, the bell type motor of this invention runs silently and heats up very little. It allows a tool design of great handiness and an autoclavation at a pressure of 3 bars and at the usual temperature of 140° C. in hospitals.

BRIEF DESCRIPTION OF THE DRAWING

The FIGURE of the drawing shows a view partly in cross-section with the wire coil at its one front end fixed to the rotor carrier plate and the other end self-supporting.

DESCRIPTION OF PREFERRED EMBODIMENT

In the following description the invention will be explained in connection with an example and the drawing, which drawing is a view partly in cross-section of the motor of this invention.

A magnetic carrier plate 12 is fixed to a cylindrical housing 11 of a bell type motor. The plate 12 and a tube 13 in this example are made out of one piece of material. A shaft 14 is mounted rotatably in the bearings 15 and 16. The bearing 15 is inside the housing 11 of the motor. The tube 13 and the magnet carrier plate 12 carry a magnet 17, having the shape of a hollow cylinder. The magnet 17 is fixed with the tube 13, forming a cylindrical carrier member, for instance by being glued or otherwise fixed to the tube 13.

A rotor carrier plate 21 is set onto the shaft 14 and fixed to it. It therefore rotates with the shaft 14. The rotor of the motor comprises besides the rotor carrier plate 21 a wire coil 22 made of lacquered wire windings. The wire coil 22 has the shape of a hollow cylinder of circular cross section. According to the drawing, it has its right-hand side end pushed onto the rotor carrier plate 21 and fixed to it, for example fastened with wires. The wire coil 22 is carried by the plate 21, so that the shaft 14, the plate 21 and the coil 22 are connected together rotationally. By providing holes 26, the weight of the plate 21 may be reduced. By means of brushes 27 current is supplied to a collector 23 for driving the motor.

As stated, the use of a rotor carrier plate 21 made of antimagnetic and stainless steel has the advantage that when heating up, the expansion in all directions is uniformly equal, and when cooling down after the retraction, the original form is again obtained with great accuracy. Additionally, it is possible to manufacture such a plate with great accuracy. By grinding, an accuracy of up to 1/1000 millimeter can be achieved and any imbalance can be eliminated completely. There results therefore a motor running very silently.

The air gap 24 between the magnet 17 and the wire coil 22 can be made very accurately. The expansion coefficient of the carrier plate 21 is made approximately equal to the expansion coefficient of the magnet 17, so that the size of the air gap 24 remains constant at changing temperatures. A rotor carrier plate 21 made of steel and mounted on a shaft 14 made of hardened steel can be balanced more accurately than a plastic plate, so that there results an operation of the motor which is far more free of vibration and far more silent than is the case when using a plastic plate.

The air gap 24 must be at least of such size that contact between the wire coil 22 and the magnet 17 is avoided at all working conditions. The more accurate the measurements of the air gap 24 can be kept, the thinner the air gap 24 can be. On the other hand, a thinner air gap means an increase of the efficiency of the motor and therewith a decrease of the physical dimensions of it, so that its weight is again reduced somewhat more, so that the tool drive by the motor becomes again handier.

The precision of the dimensioning of the air gap 24 is also improved by using a rotor carrier plate 21 and a wire coil 22, which before assembling have been subjected several times to a heating up and a cooling down process. Such a treatment can, for example, be performed in such a way that the wire coil 22 fixed to the rotor carrier plate 21 is pushed upon a cylindrical form of given dimensions, and in this condition the parts 21 and 22 are first exposed at least two times to a temperature between 130° and 160° C. in a wet surrounding, for example in water steam, and are afterwards exposed at least twice in a dry surrounding to a temperature between 130° and 170° C. It is also possible to choose, according to different circumstances, different sequences for the heating up process.

Especially in view of an autoclavation in steam, a particularly advantageous embodiment of the invention has a wire coil which is coated with a water repelling lacquer, for instance a ceramic lacquer. It can occur that the lacquer of the wire coil 22 will absorb some humidity. The possibility of a deformation of the wire coil 22 is eliminated by a protective coating of a ceramic lacquer. The procedure mentioned before additionally reduces the possibility of a variation in the air gap 24 caused by autoclavation.

When working with a surgical tool, the speed of the tool is continuously changed. Often, this kind of tool has a so-called instant stop wherein by reversement of poles, the driving current in fractions of a second leads to a sudden stop. In all these procedures heat is produced, the amount of which depends on the weight to be accelerated and decelerated. It is essential that a bell type motor with a wire coil 22 carried by a rotor carrier plate of antimagnetic, stainless steel represents a combination having a minimum weight and thus leads to a minimum of heating up.

To avoid possible deformation of the wire coil 22 at its end, which in the drawing is on the left side, in a special embodiment there is provided at this end a cover 25, pushed over the winding 22. The cover 25 has a U-shaped cross-section of antimagnetic stainless steel, which may be covered with an electrically insulating coating. In this manner the cover 25 keeps the wire coil 22 in an exact circular shape. Therewith a possibility for additionally fixing the circular shape of the wire coil is obtained, which is an additional safety precaution for the autoclavation.

The provision of the tube 13, which may form, together with the magnet carrier plate 12, a single piece, also adds to the higher precision of the air gap. This is so because the plate 12 with the magnet 17 glued to the tube 13 can be ground over again, and in this manner can be manufactured with very high accuracy.

The electrical bell type motor for driving a surgical hand tool has a stator comprised of a magnet having the shape of a circular cylinder and a rotor, which comprises a wire coil 22 of lacquered wire forming a hollow circular cylinder, and a rotor carrier plate 21 carrying the wire coil and being fixed to a rotatable shaft 14, in which the wire coil with one of its front ends is firmly mounted onto the rotor carrier plate and the other end is self-supporting, and the rotor carrier plate consists of a very thin disc of antimagnetic stainless steel.

Also, the electrical bell type motor has a coil in which its surface is provided with a water rejecting type of coating such as lacquer and the like.

Although the invention is described in detail for the purpose of illustration, it is to be understood that such detail is solely for that purpose and that variations can be made therein by those skilled in the art without departing from the spirit and scope of the invention except as it may be limited by the claims.

What is claimed is:

1. Electrical bell type motor for driving a surgical hand tool, with a stator comprising a magnet having the shape of a circular cylinder and a rotor, which comprises a wire coil of lacquered wire forming a hollow circular cylinder, and a rotor carrier plate carrying the wire coil and being fixed to a rotatable shaft, in which the wire coil with one of its ends is firmly mounted onto the rotor carrier plate and the other end is self-supporting, wherein the rotor carrier plate consists of a very thin disc of antimagnetic stainless steel and in which the rotor carrier plate together with the wire coil exposed at least twice to a temperature between 130° and 170° C. in dry condition and at least twice at a temperature between 130° and 160° C. in a wet surrounding, preferably in steam and a ring shaped cover of U-shaped cross-section is arranged over the other end of the wire coil which cover is made of antimagnetic stainless steel.

2. The electrical bell type motor according to claim 1 in which the magnet has the shape of a hollow cylinder and is carried by a tube tightly fixed to the inner surface of the magnet, wherein the tube and the magnet carrier plate fixed to the housing of the motor are formed from a single piece.

3. The electrical bell type motor according to claim 1 in which the surface of the wire coil is provided with a water rejecting coating.

* * * * *